US006364817B1

United States Patent
McNamara et al.

(10) Patent No.: US 6,364,817 B1
(45) Date of Patent: Apr. 2, 2002

(54) AUTOMOTIVE FRAMING APPARATUS

(75) Inventors: Jeffrey S. McNamara, Grosse Ile; William M. Faitel, New Baltimore; Douglas J. Schrandt, Chesterfield Township; Donald D. Pagels, Jr., Grosse Pointe Woods; Zhiguo Shen, Madison Heights, all of MI (US)

(73) Assignee: Unova Ip Corp., Woodland Hills, CA (US)

( * ) Notice: Subject to any disclaimer, the term of this patent is extended or adjusted under 35 U.S.C. 154(b) by 0 days.

(21) Appl. No.: 09/658,477

(22) Filed: Sep. 8, 2000

(51) Int. Cl.$^7$ .................. B23Q 3/155; B23P 19/00; B21D 39/00
(52) U.S. Cl. .................. 483/1; 29/33 K; 29/791; 219/158; 228/4.1; 483/14
(58) Field of Search .................. 483/14, 15, 1, 483/901; 29/33 K, 711, 791, 430, 823, 564; 219/158, 219; 228/4.1; 414/786

(56) References Cited

U.S. PATENT DOCUMENTS

| | | | | |
|---|---|---|---|---|
| 4,162,387 A | * | 7/1979 | De Candia | 219/158 X |
| 4,392,601 A | * | 7/1983 | Fujikawa et al. | 29/430 |
| 4,670,961 A | | 6/1987 | Fontaine et al. | |
| 4,682,722 A | * | 7/1987 | Bossotto et al. | 228/4.1 |
| 4,737,611 A | * | 4/1988 | Humbolt | 219/219 X |
| 4,928,383 A | * | 5/1990 | Kaczmarek | 29/791 |
| 4,946,089 A | | 8/1990 | Baulier et al. | |
| 5,186,304 A | * | 2/1993 | Kaczmarek | 29/711 |
| 5,199,156 A | * | 4/1993 | Rossi | 483/14 X |
| 5,313,695 A | | 5/1994 | Negre et al. | |
| 5,560,535 A | | 10/1996 | Miller et al. | |

FOREIGN PATENT DOCUMENTS

WO          97 09226        *  3/1997    ..................... 483/14

* cited by examiner

Primary Examiner—William Briggs
(74) Attorney, Agent, or Firm—Reising, Ethington, Barnes, Kisselle, Learman & McCulloch, P.C.

(57) ABSTRACT

An automotive framing apparatus with a support frame having a frame roof supported above a generally horizontal support surface. At least four gate assemblies are carried by a carrousel supported on the frame roof for rotational movement around a common vertical axis and form two gate assembly pairs of diametrically-opposed gate assemblies. The gate assemblies of each gate assembly pair are supported for pivotal movement between generally horizontal stowed and generally vertical working positions. A rotary drive selectively positions one gate assembly pair at a time in a framing position from which the two gate assemblies of the selected gate assembly pair can be pivoted by a drive downward to respective diametrically opposed working positions on opposed sides of a vehicle body to be welded.

17 Claims, 7 Drawing Sheets

AUTOMOTIVE FRAMING APPARATUS

TECHNICAL FIELD

This invention relates generally to an automotive framing apparatus for performing operations such as positively locating portions of an automotive vehicle being assembled in an assembly line process.

BACKGROUND OF THE INVENTION

It is known for an automotive framing apparatus or framing station to include a rectangular support frame that includes front and rear pairs of vertical corner posts or pillars and horizontal cross beams that define a frame roof. Carriages serially transport vehicle bodies along a vehicle path that passes under the frame roof and between the front and rear pairs of corner posts. Such an automotive framing apparatus may also include gate assemblies that close around a vehicle body and carry a plurality of tool fixtures that support tools such as clamps and locator pins in positions to engage a vehicle body positioned within the support frame. The tools are commonly used to positively locate and stabilize portions of the vehicle body and/or frame to improve the accuracy of robotic welding operations. Some framing stations are also known to be rapidly adaptable to different vehicle body configurations by interchanging gate assemblies. The ability of an automotive framing apparatus to flexibly adapt to various vehicle body configurations is extremely important to automobile manufacturers.

One such framing system is disclosed in U.S. Pat. No. 5,313,695 issued May 24, 1994 to Negre et al. The Negre et al. patent discloses a framing station that includes a rectangular support frame. The support frame includes horizontal crossbeams that define a frame roof under which vehicle bodies are carried by an assembly line carriage system. The Negre et al. framing station includes four gate assemblies supported in two diametrically opposed gate assembly pairs on the frame roof for rotational movement around a common vertical axis and pivotal movement about respective horizontal axes between a stowed position and a working position. A rotary drive is operatively connected to the gate assemblies and rotates the gate assembly pairs around the common vertical axis between an idle position aligned with the vehicle path and a framing position transverse to the vehicle path when the gate assemblies are in their respective stowed positions. The rotary drive selectively positions one of the two gate assembly pairs at a time in the framing position where the two gate assemblies of the selected gate assembly pair can be pivoted downward to their respective working positions. A pivot drive is also operatively connected to the gate assemblies and rotates the gate assemblies of the selected gate assembly pair between their respective stowed and working positions on either side of a vehicle body to be welded. A plurality of tool fixtures are supported on each gate assembly and support tools in positions to secure a vehicle body positioned within the support frame when the gate assemblies are in their respective working positions. The fixture positioning for each gate assembly pair is adapted to accommodate a specific corresponding vehicle body type. This allows an operator to rapidly convert the apparatus between two different configurations required to perform welding operations on two different vehicle body types. The conversion is accomplished by first upwardly pivoting the gate assemblies of a previously selected gate assembly pair to their respective stowed positions. The gate assemblies of a newly selected gate assembly pair are then rotated into the framing position and are pivoted downward to their respective working positions.

Another example of such a framing system is disclosed in U.S. Pat. No. 4,670,961 issued Jun. 9, 1987 to Fontaine et al. The Fontaine et al. patent discloses a front rotary gate assembly magazine suspended from a support frame roof above a vehicle path and supporting four front gate assemblies for rotation about a front vertical axis and for pivotal motion about respective horizontal axes. Each of the front gate assemblies is selectively rotatable to a front framing position and, from the front framing position is downwardly pivotable to a working position to service a front region of a vehicle body positioned beneath the support frame roof. A rear rotary gate assembly magazine is also suspended from a support frame roof above a vehicle path and supports four rear gate assemblies for rotation about a rear vertical axis and for pivotal motion about respective horizontal axes. Each of the rear gate assemblies is selectively rotatable to a rear framing position and, from the rear framing position is downwardly pivotable to a working position to service a rear region of a vehicle body positioned beneath the support frame roof.

However, the gate assemblies of the Negre et al. and Fontaine et al. framing stations are supported beneath their respective frame roofs. Therefore, the frames must be tall enough to suspend the gate assemblies in positions where they will not interfere with vehicle bodies as they pass through the framing stations. In addition, the corner posts must be set far enough apart, and therefore, the frame footprints must be broad enough so that the gate assemblies will clear the corner posts when rotating in their respective stowed positions.

SUMMARY OF THE INVENTION

An automotive framing apparatus is provided that includes a support frame having a frame roof supported above a generally horizontal support surface. At least four gate assemblies are supported in a circumferentially-spaced array on the frame roof for rotational movement around a common vertical axis. The four gate assemblies form two pairs of diametrically-opposed gate assemblies. The gate assemblies of each gate assembly pair are supported for pivotal movement between respective diametrically-opposed stowed and working positions about respective horizontal axes. A rotary drive is operatively connected to the gate assemblies and is configured to rotate the gate assemblies around the common vertical axis when the gate assemblies are in their respective stowed positions. The rotary drive rotates the gate assemblies between an idle position aligned with the vehicle path and a framing position transverse to the vehicle path. The rotary drive is configured to selectively position one gate pair at a time in the framing position from which the two gate assemblies of the selected gate assembly pair can be pivoted downward to respective diametrically opposed working positions on either side of a vehicle body to be welded. A pivot drive is operatively connected to the gate assemblies and is configured to pivot the gate assemblies of the selected gate assembly pair between their respective stowed and working positions. Tool fixtures are supported on the gate assemblies and are configured to support tools in positions to perform operations on a vehicle body positioned under the frame roof when the gate assemblies supporting the tool fixtures are in their respective working positions. Each gate assembly pair supports tool fixtures positioned to allow tools to perform operations on a specific corresponding vehicle body type. This allows the apparatus to quickly convert between two different tooling configurations as required to perform operations on two different vehicle body types.

The automotive framing apparatus also includes a rotary carrousel supported on the frame roof for rotation around the common vertical axis. The gate assemblies are pivotally supported on the rotary carrousel and are disposed above the frame roof when in their respective stowed positions. Because the gate assemblies rotate above the frame roof, the lateral dimensions of the support frame can be smaller than the diametrical reach of the gate assembly pairs in their stowed positions. Positioning the gate assemblies above the support frame also allows the height of the support frame to be less than would be required to suspend the carrousel and gate assemblies below the frame roof. Therefore, an automotive framing apparatus constructed according to the invention is able to flexibly adapt to different vehicle body configurations in an assembly line process while requiring a smaller support frame footprint and smaller vertical support frame dimensions than existing systems.

The invention also includes a method for using the framing apparatus to perform framing operations on an automotive vehicle body in an assembly line process. According to this method, after performing operations on one or more vehicle bodies of a first configuration, one can flexibly adapt the automotive framing apparatus to perform operations on one or more vehicle bodies of a second configuration. This is done by first pivoting the gate assemblies of a previously selected gate assembly pair upward to their respective stowed positions. The gate assemblies of the newly selected gate assembly pair are then rotated around the common vertical axis into the framing position and are downwardly pivoted to their respective working positions. The tools supported on the newly selected gate assembly pair are then actuated to perform operations on a vehicle body of the second configuration that is disposed on the vehicle path between the gate assemblies.

Objects, features and advantages of this invention include the ability to flexibly service up to three different vehicle body configurations on a single assembly line, to reduce friction between gate assemblies and structures that support them, to smoothly convert vertical reciprocal ram motion into arcuate reciprocal gate assembly motion, to allow an operator to install gate portions configured to perform operations on different body types, to more positively locate portions of a vehicle body in proper relative positions for welding, to improve weld accuracy through improved gate assembly stabilization, to allow vehicles bodies of like configuration to be sequenced through the framing apparatus without having to lift the gate assemblies to their stowed positions, and to significantly reduce the amount of energy required to drive gate assemblies and the amount of wear on associated machinery.

BRIEF DESCRIPTION OF THE DRAWINGS

These and other objects, features and advantages of this invention will be apparent from the following detailed description of the preferred embodiment(s) and best mode, appended claims, and accompanying drawings in which:

DETAILED DESCRIPTION

Figure 1:
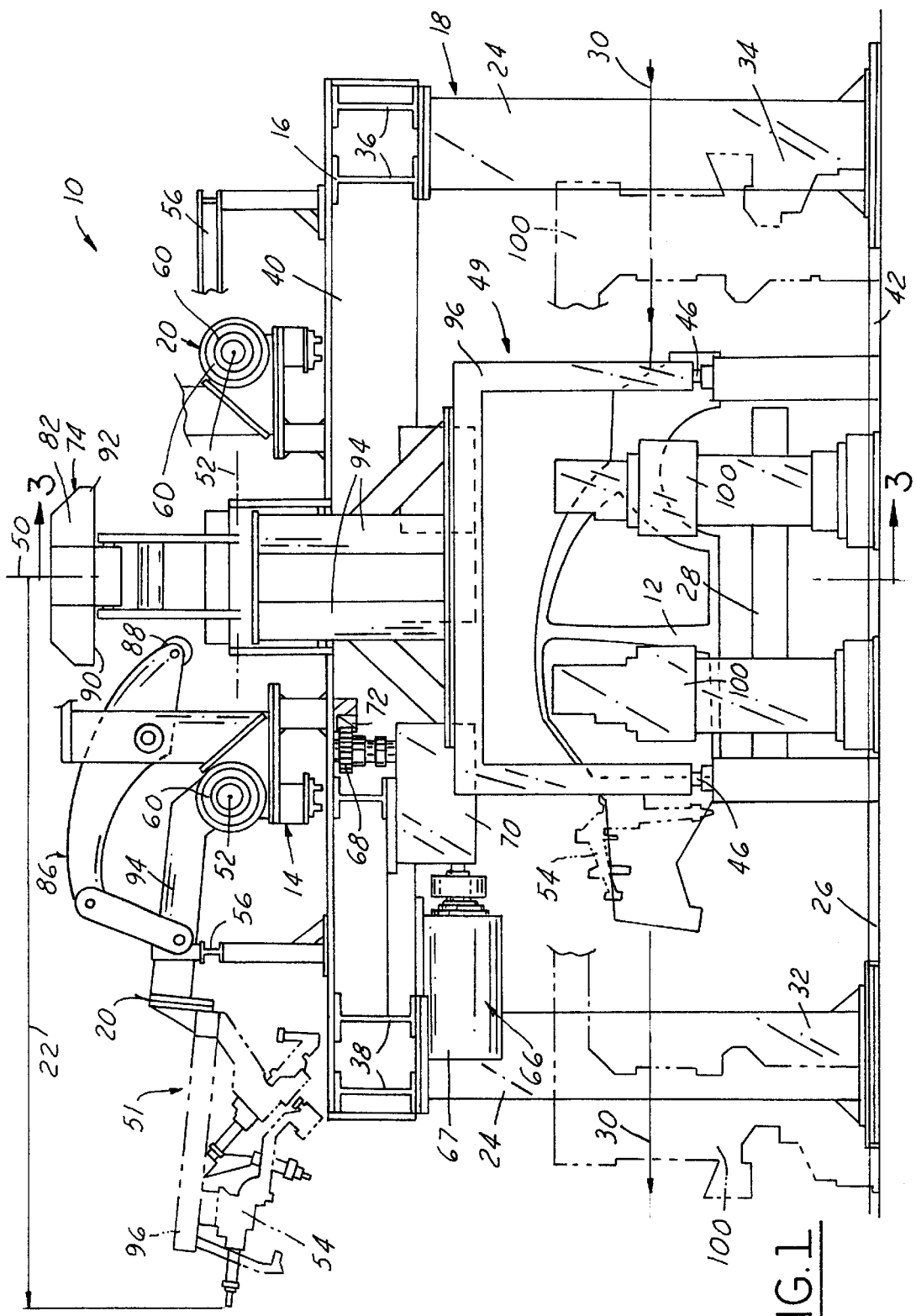
FIG. 1 is a side view of an automotive vehicle supported at a work station within a framing apparatus constructed according to the invention with welding robots and tooling shown in phantom.
Figure 2:
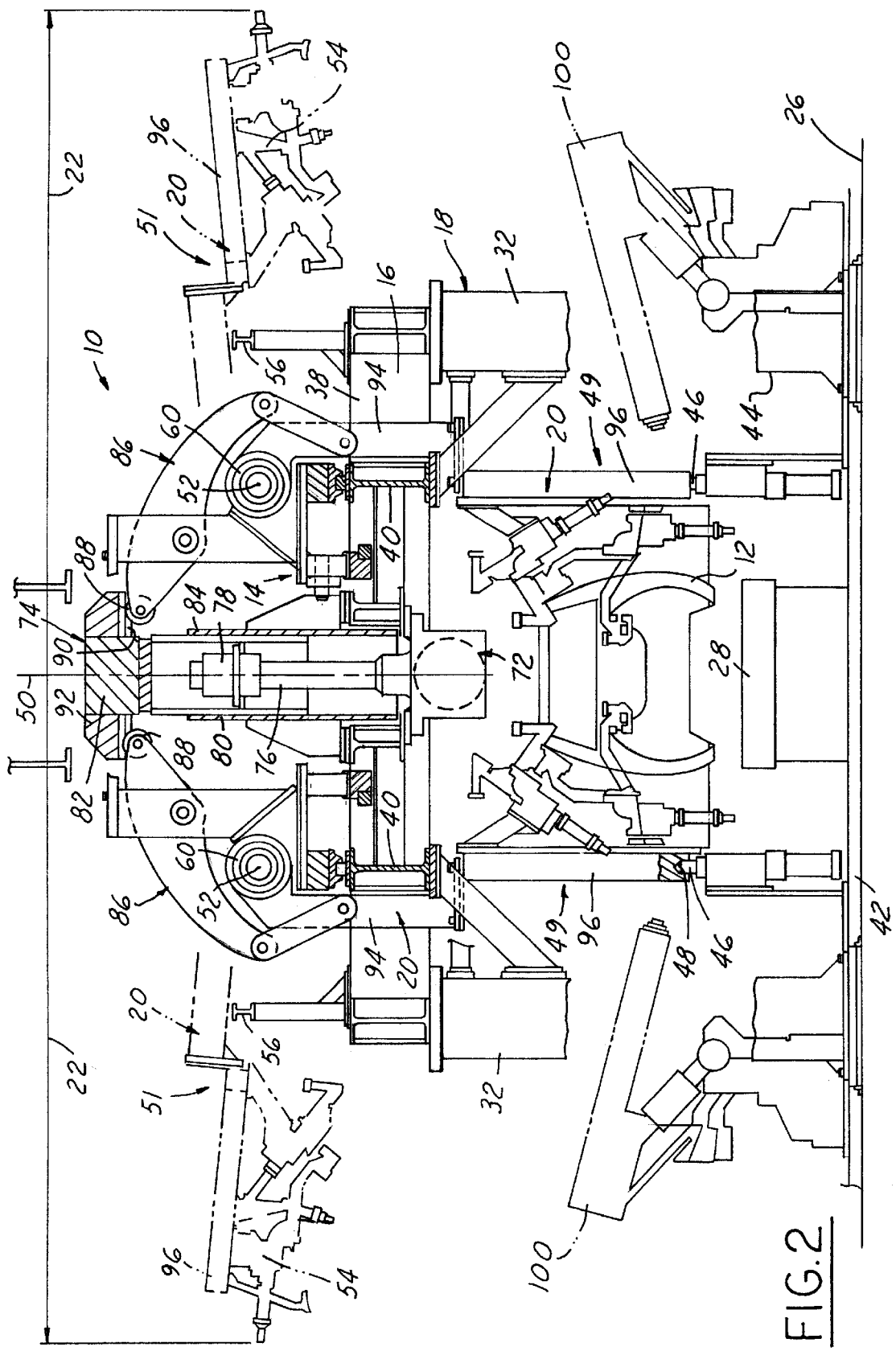
FIG. 2 is an end view of the automotive vehicle and framing apparatus of FIG. 1 with the welding robots and tooling again shown in phantom.

Shown in FIGS. 1–6, is an automotive framing apparatus 10 constructed according to the invention. The apparatus 10 is configured to perform operations such as positively locating portions of an automotive vehicle body 12 that are to be assembled and welded together in an assembly line process. The apparatus 10 includes a rotary gate carrousel 14 rotationally supported on the roof 16 of a support frame 18. The rotary gate carrousel 14 supports six gate assemblies 20, in three gate assembly pairs, at circumferentially spaced locations around the carrousel 14 and above the frame roof 16 when the gate assemblies 20 are in respective generally horizontal stowed 21 and framing 51 positions as shown in FIGS. 1, 2, 3, 4 and 6. As best shown in FIGS. 1 and 2, this allows lateral dimensions of the support frame 18 to be smaller than a diametrical reach 22 of the gate assembly pairs while in and rotating between their generally horizontal stowed and framing positions 21, 51. (The diametrical reach 22 of a gate assembly pair being twice the horizontal distance between a furthest radially outer distal end of one of the gate assemblies of the pair in a generally horizontal stowed or framing position 21, 51; and a common vertical rotational axis 50 of the gate pairs.) Because the gate assemblies 20 are mounted above the frame roof 16 when in the stowed and framing positions 21, 51, they do not interfere with supporting elements 24 of the frame 18, therefore allowing the frame 18 to be laterally smaller, i.e., providing a smaller support frame footprint. The apparatus 10 can flexibly convert between three different welding configurations at a framing station in an assembly line process. In addition, it can do so without requiring its support frame 18 to have a diagonal footprint measurement greater than the diametrical reach 22 of the gate assembly pairs with the gate assemblies 20 in their generally horizontal stowed and framing positions 21, 51.

Locating the gate assemblies 20 and carrousel 14 on or over the roof 16 also allows the height of the support frame 18 to be less than would be required to suspend the carrousel 14 and gate assemblies 20 below the frame roof 16. When the gate assemblies 20 or carrousel 14 are suspended below the roof 16 of a support frame 18, the roof 16 must be positioned high enough to prevent the carrousel 14 and gate assemblies 20 from interfering with a vehicle body 12 or other workpiece positioned within the frame 18. With the gate assemblies 20 and carrousel 14 supported on or over the support frame roof 16, the support frame roof 16 need only be high enough to allow vehicle bodies to pass beneath. In other words, the apparatus 10 can flexibly convert between three different welding configurations at a framing station in an assembly line process without requiring its support frame 18 to have a height that exceeds the height of the gate assemblies 20 in their generally horizontal stowed and framing positions 21, 51.

The support frame roof 16 is supported above and generally parallel to a generally horizontal support surface 26. A vehicle body carriage 28 is supported beneath the frame roof 16 for movement along a vehicle path 30 best shown in FIGS. 1 and 6. The vehicle body carriage 28 is configured to transport portions of the vehicle body 12 through the support frame 18 along the vehicle path 30.

The support frame 18 also includes front and rear pairs of vertical corner posts 32, 34 arranged in a rectangular pattern. Front and rear pairs of horizontal transverse cross beams 36, 38 of the support frame 18 connect the upper ends of the front and rear pairs of vertical corner posts 32, 34, respectively. Parallel horizontal longitudinal cross beams 40 connect the front and rear transverse cross beams 36, 38. Lower ends of the vertical corner posts are fixed to respective corners of a rectangular bed plate 42 but may be fixed directly to or supported directly on the support surface 26. The crossbeams 36, 38, 40 define the support frame roof 16. As best shown in FIG. 2, the front vertical corner posts 32 and the front transverse crossbeam 36 define an entry port 44. Likewise, the rear vertical corner posts 34 and the rear transverse crossbeam 38 define an exit port. The entry and exit ports are configured to respectively receive and discharge vehicle bodies as they pass through the framing apparatus 10 along the vehicle path 30.

Figure 4:
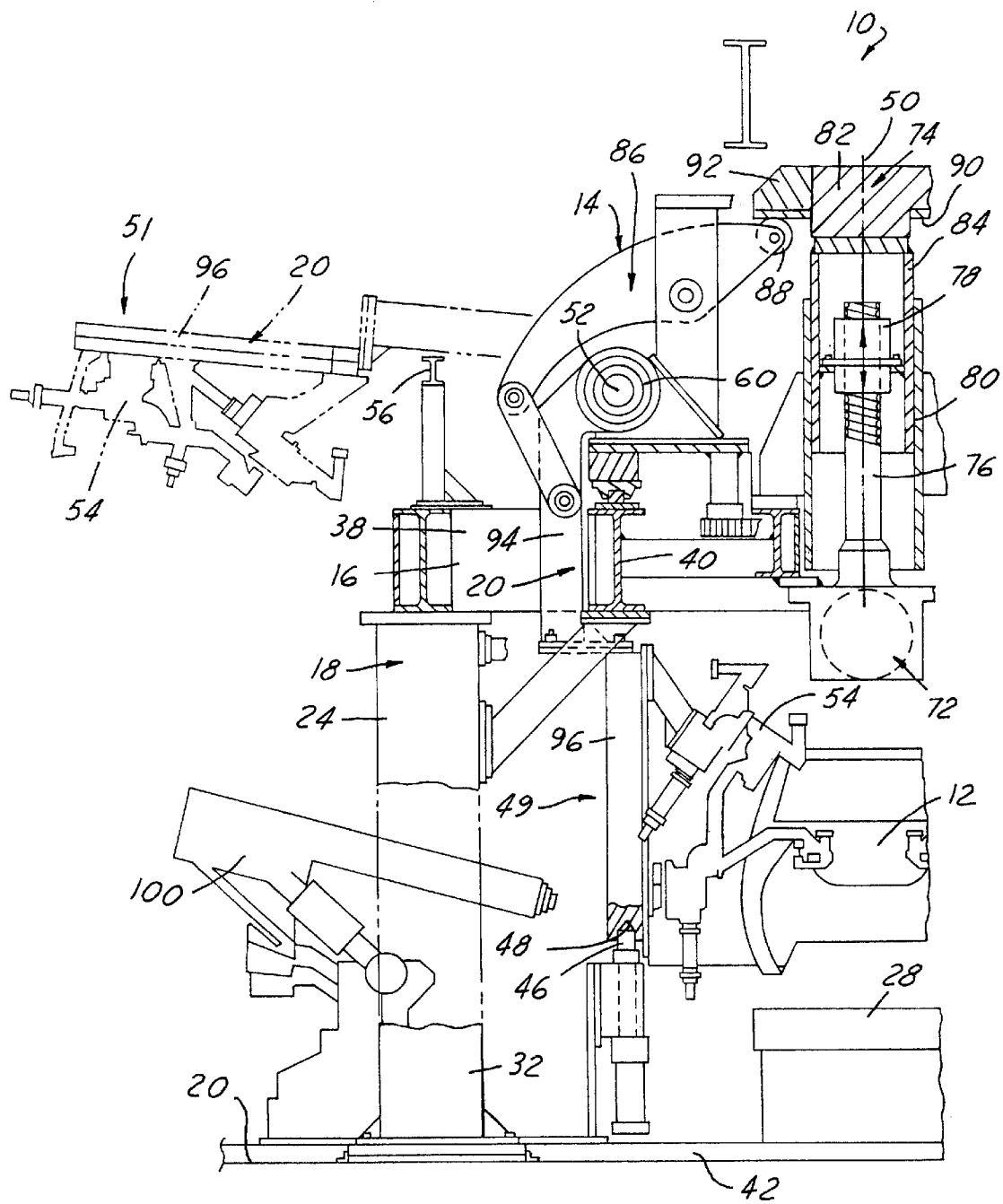
FIG. 4 is a partial cross-sectional end view of the automotive vehicle and framing apparatus of FIG. 1 taken along line 3—3 of FIG. 1 but with one gate of the selected pair of gates shown in a working position.

As best shown in FIGS. 2 and 4, the support frame 18 includes gate locator pins 46 positioned and configured to be driven by rams upward into complementary recesses 48 formed in the gate assemblies 20 when the gate assemblies 20 are in generally vertical working positions 49. The engaged pins 46 improve weld accuracy by stabilizing the gate assemblies 20 in their working positions 49.

Figure 3:
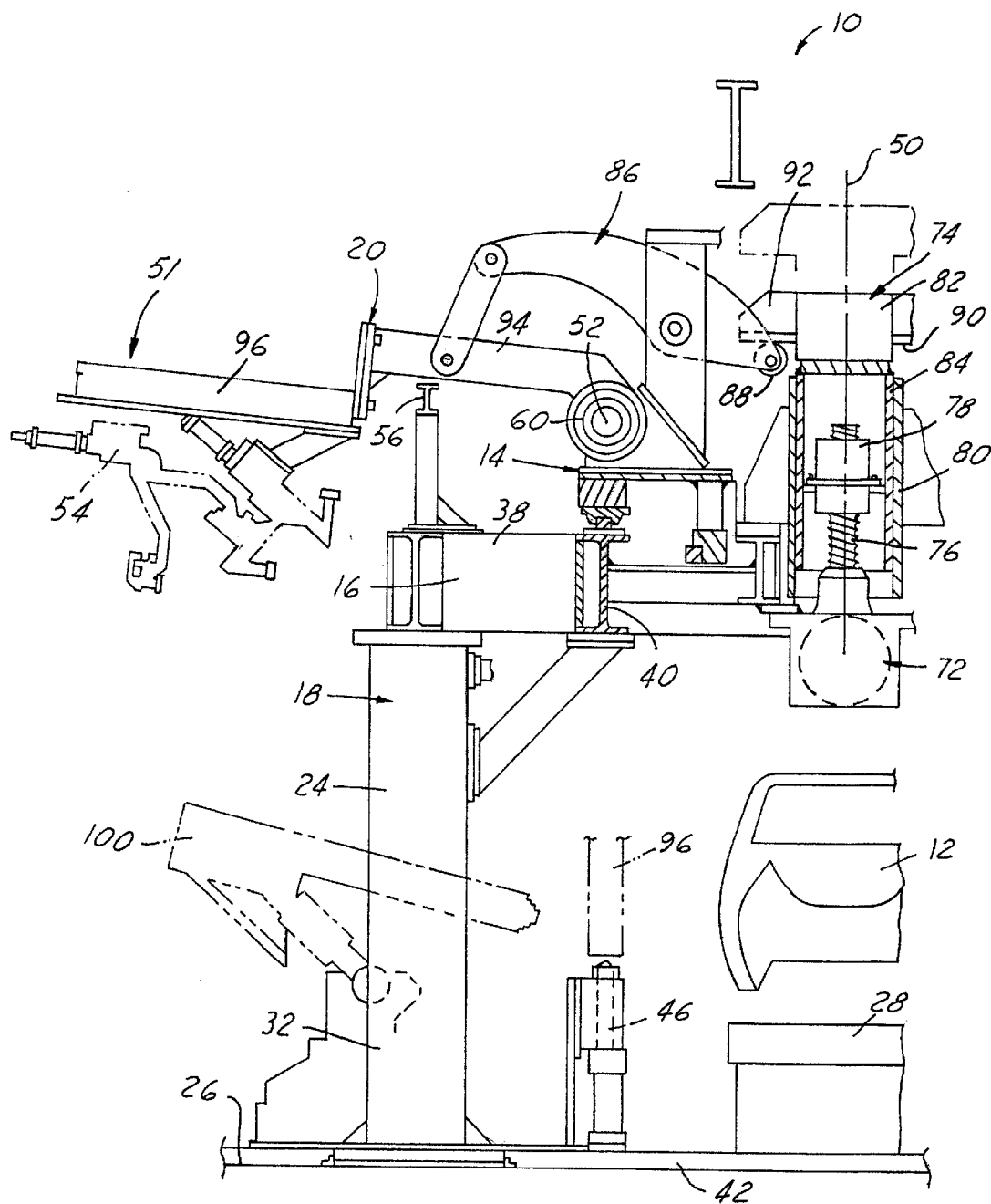
FIG. 3 is a partial cross-sectional end view of the automotive vehicle and framing apparatus of FIG. 1 taken along line 3—3 of FIG. 1 and with one gate of a selected pair of gates shown in a stowed position.
Figure 6:
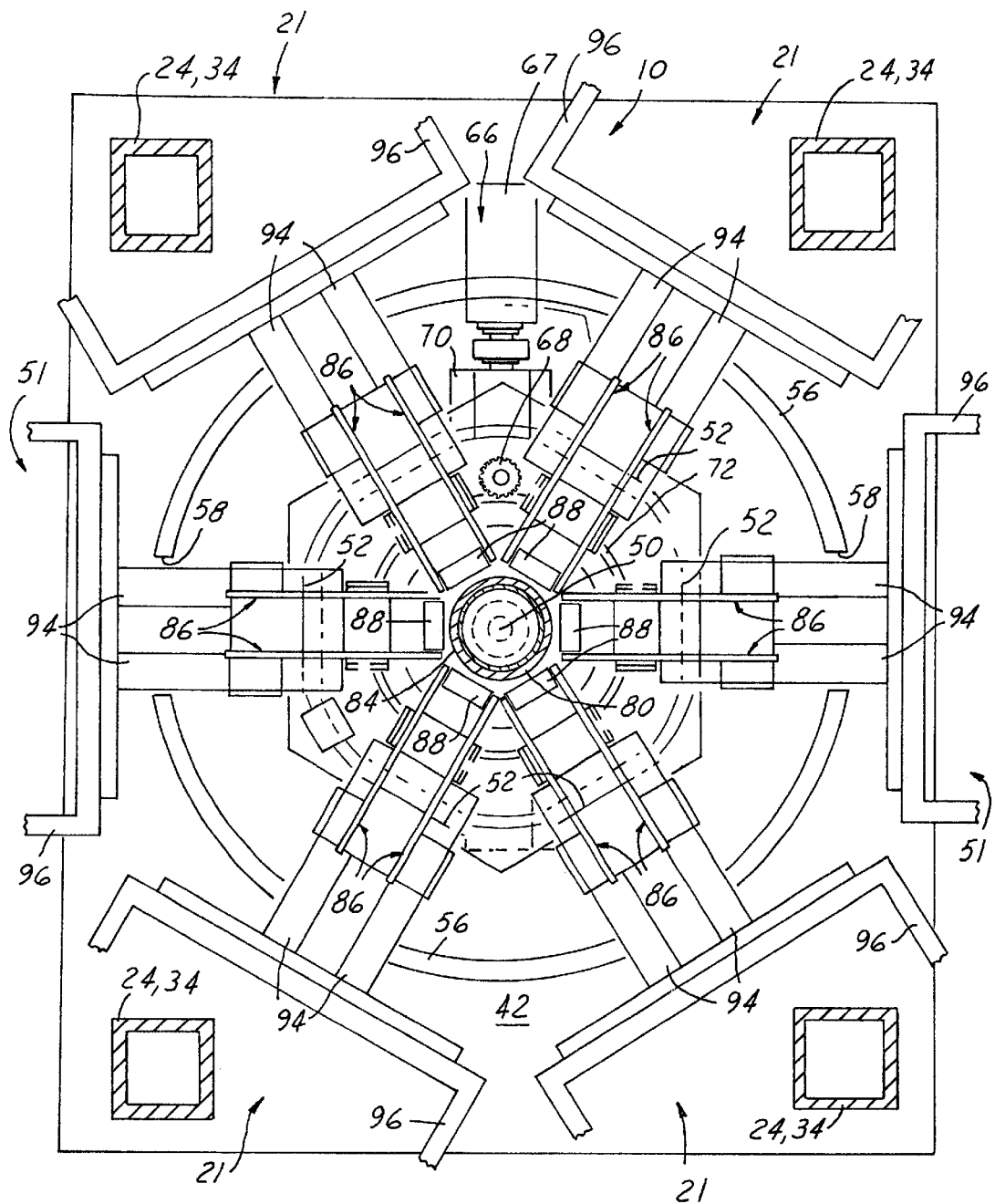
FIG. 6 is a partial top view of the framing apparatus of FIG. 1 with 5 of 6 gates omitted for clarity.

As best shown in FIG. 6, the six gate assemblies 20 are supported in a circumferentially-spaced array on the gate carrousel 14 for rotational movement around a common vertical axis 50 and form the three gate assembly pairs of diametrically-opposed gate assemblies 20. As best shown in FIGS. 3 and 4, the gate assemblies 20 of each gate assembly pair are supported for pivotal movement between the respective diametrically-opposed working and framing positions 49, 51 about respective horizontal axes 52.

Tools and tool fixtures 54 are supported on the gate assemblies 20. The fixtures support the tools in positions to perform operations on vehicle bodies 12 positioned under the frame roof 16 when the gate assemblies 20 supporting the tools and fixtures 54 are in their respective working positions 49. The tools and fixtures 54 include holding devices such as clamps and locating pins that positively locate portions of a vehicle body 12 in proper relative positions for welding when the gate assemblies 20 are in their respective working positions 49. Each gate assembly pair supports tools and fixtures 54 positioned to allow the tools to perform such operations or to allow separately supported tools to perform such operations on a specific corresponding vehicle body type. This allows an operator to quickly convert the apparatus 10 from one tooling configuration to another to accommodate a different vehicle type.

The gate assembly carrousel 14 includes a circular rail 56 coaxially supported on the frame roof 16 relative to the common vertical axis 50 and configured to support the gate assemblies 20 in the stowed position. The circular rail 56 includes diametrically opposed gaps (one of which is shown at 58 in FIG. 6) that are sized and positioned to allow the gate assemblies 20 in respective generally horizontal framing positions 51 to be pivoted downward through a plane of the rail 56 to their respective working positions 49.

The gate assembly carrousel 14 also includes six circumferentially-spaced gate pivots 60. The gate pivots 60 are pivotally connected to respective inner ends of each gate assembly 20 and support their respective gate assemblies 20 for pivotal motion about the respective horizontal pivot axes 52.

As best shown in FIGS. 1 and 6, a rotary drive 66 is operatively connected to the gate assemblies 20 and is configured to rotate the gate assemblies 20 around the common vertical axis 50. When the gate assemblies 20 are in their stowed positions the rotary drive 66 rotates the gate assemblies 20 between framing positions transverse to the vehicle path 30 and one of the stowed positions 21 disposed between the framing positions as best shown in FIG. 6. The rotary drive 66 is configured to selectively position the gate assemblies 20 of one gate pair at a time in the respective framing positions 51. From the framing positions 51 the two gate assemblies 20 of the selected gate assembly pair can be pivoted downward to respective diametrically opposed working positions 49. As shown in FIGS. 1 and 6, the rotary drive 66 includes a rotary drive motor 67 drivingly connected to a gear 68 through a gear reducer 70. The gear 68 engages a circular horizontal toothed rack 72 fastened to the carrousel 14 in such a way as to cause the carrousel 14 to rotate as the gear 68 rotates.

As shown in FIGS. 2–4, a pivot drive 72 is operatively connected to the gate assemblies 20. The pivot drive 72 is configured to pivot the gate assemblies 20 of a selected gate assembly pair downward from their respective diametrically-opposed framing positions 51 to their respective working positions 49 on either side of a vehicle body 12 to be welded. The pivot drive 72 also rotates the gate assemblies 20 back upward from their working positions 49 to their framing positions 51 when welding operations are complete on a given vehicle body 12.

The pivot drive 72 includes a ram 74 supported on the frame roof 16 for linear reciprocal movement along the common vertical axis 50 and drivingly connected to the gate assemblies 20. The ram 74 is configured to raise the gate assemblies 20 to their respective stowed positions and to lower the gate assemblies 20 from the respective framing positions 51 to the respective working positions 49.

As shown in FIGS. 2–4, a ball screw drive 76 of the pivot drive 72 is drivingly connected to a ball screw 78 that is operatively connected to the ram 74. The ball screw drive 76 and ball screw 78 reciprocally drive the ram 74 along the common vertical axis 50.

The ram 74 includes a stationary sleeve 80 supported on the frame roof 16. A ram head 82 is supported on a sliding inner sleeve 84 that is telescopically supported within the stationary sleeve 80. The ram head 82 and sliding inner sleeve 84 are slidably supported within the stationary sleeve 80 for reciprocal motion along the common vertical axis 50. The ball screw 78 drivingly engages the sliding inner sleeve 84.

The pivot drive 72 includes four pivot linkages 86. One end of each pivot linkage 86 is pivotally connected to one of the gate assemblies 20 in a position spaced from the gate pivot 60 pivotally supporting that gate assembly 20 on the carrousel. Another end of each pivot linkage 86 includes a roller 88 that engages an annular under surface 90 of the ram head 82 to convert vertical reciprocal ram motion into arcuate reciprocal gate assembly motion. The annular under surface 90 of the ram head 82 is disposed on an annular rotating portion 92 of the ram head 82 configured to rotate around the common vertical axis 50 with the pivot linkages and gate assemblies 20.

Each gate assembly 20 includes a pair of parallel support arms 94 pivotally connected to the carrousel 14 at the associated gate pivot 60 and a removable, interchangeable U-shaped gate portion 96 mounted to the support arms 94. This arrangement allows an operator to install differently configured gate portions adapted to perform operations on different body types.

Figure 8:
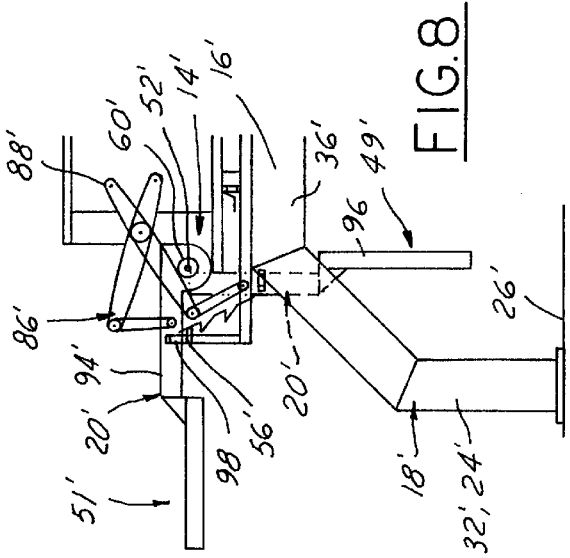
FIG. 8 is a partial schematic end view of the framing apparatus of FIG. 7.
Figure 9:
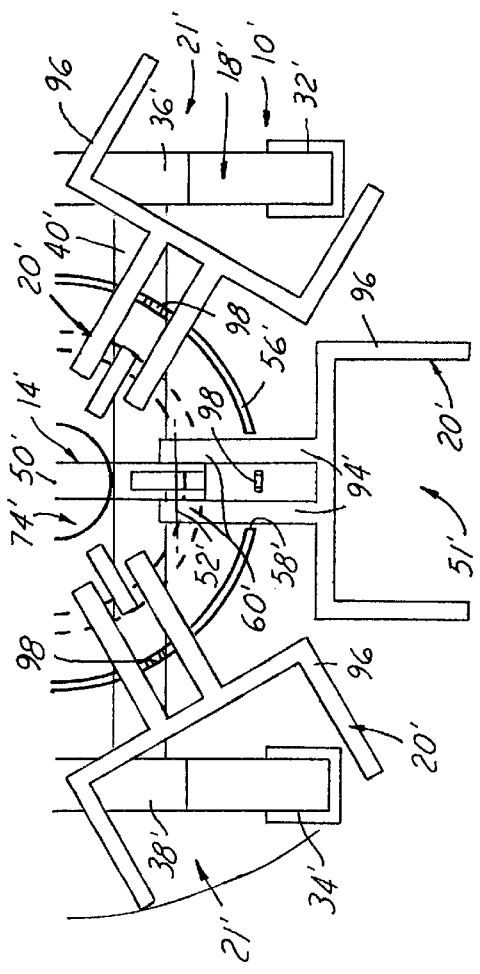
FIG. 9 is a partial schematic top view of the framing apparatus of FIG. 7 showing three of the six gates in the stowed position.
Figure 7:
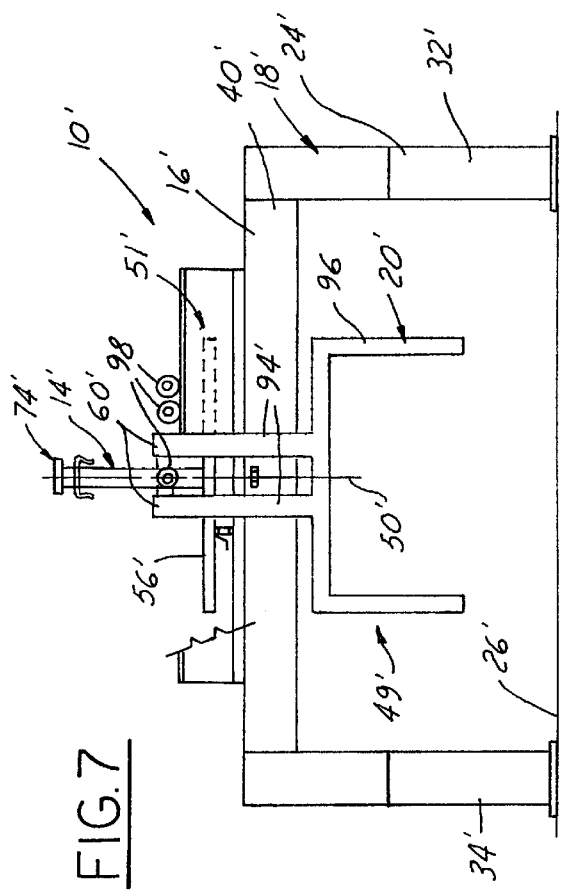
FIG. 7 is a schematic side view of an automotive vehicle framing apparatus constructed according to a second embodiment of the invention with one gate shown in a stowed position, the same gate shown in phantom in a working position and remaining gates omitted for clarity.

FIGS. 7–9 illustrate another embodiment of this invention. In the embodiment of FIGS. 7–9 those items corresponding to similar or identical items in the embodiment of FIGS. 1–6 are identified with primed numerals. According to the embodiment of FIGS. 7–9, a roller bearing 98 is supported beneath and between the gate assembly support arms 94' in a position spaced from the gate pivot 60' and aligned with the circular rail 56'. The roller bearings 98 are positioned to roll along the circular rail 56' while supporting each gate assembly 20' in its stowed position as the carrousel 14' rotates the gate assemblies 20' around the common vertical axis 50' between the framing positions 51'.

In practice, the conversion from a previously selected gate assembly pair to a newly selected gate assembly pair for performing operations on a different vehicle body type is accomplished by upwardly pivoting the gate assemblies 20 of the previously selected gate assembly pair to the respective framing positions 51. The gate assemblies 20 of the newly selected gate assembly pair are then rotated into the respective framing positions 51 as the previously selected pair is moved out. Once in the framing positions 51, the gate assemblies 20 of the newly selected gate assembly pair are rotated downwardly approximately 90 degrees to the respective working positions 49 on either side of a first vehicle disposed on the vehicle path 30 within the support frame 18. Once in the working positions 49, the locator pins 46 are driven upward into engagement with the gate assemblies 20. The various tools and/or fixtures supported on the gate assemblies 20 of the newly selected gate assembly pair are then actuated to perform operations on the first vehicle such as clamping or otherwise holding portions of the vehicle body 12 of the first vehicle in position for welding. Welding robots 100 are then activated and form welds in pre-determined locations to join the various portions of the vehicle body 12.

Figure 5:
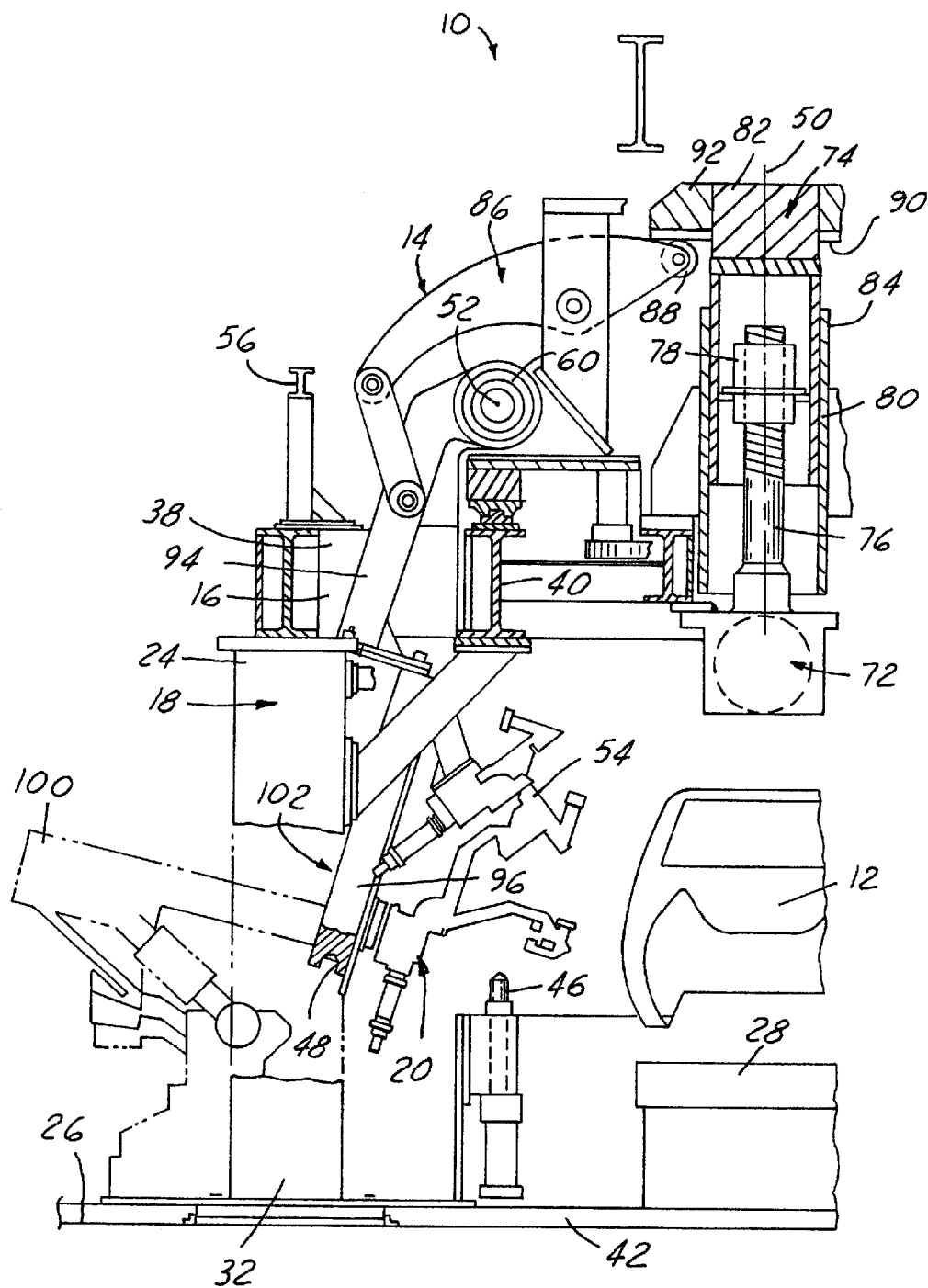
FIG. 5 is a partial cross-sectional end view of the automotive vehicle and framing apparatus of FIG. 1 taken along line 3—3 of FIG. 1 but with one gate of the selected pair of gates shown in an intermediate position

In a batch-build operation, after welding is complete, the gate assemblies 20 of the newly selected gate assembly pair are pivoted upwardly to respective, diametrically opposed intermediate positions 102 clear of the vehicle path 30 as shown in FIG. 5. The first vehicle is then moved along the vehicle path 30 from between the gate assemblies 20 of the newly selected gate assembly pair and the second vehicle is moved along the vehicle path 30 to the position between the gate assemblies 20. The gate assemblies 20 of the newly selected gate assembly pair are then pivoted downwardly from the respective intermediate positions 102 to the respective working positions 49 on either side of the second vehicle. The tools supported on the newly selected gate assembly pair and the welding robots are then actuated to perform the same operations on the second vehicle body as they performed on the first vehicle body 12.

This description is intended to illustrate certain embodiments of the invention rather than to limit the invention. Therefore, it uses descriptive rather than limiting words.

Obviously, it's possible to modify this invention from what the description teaches. Within the scope of the claims, one may practice the invention other than as described.

What is claimed is:

1. An automotive framing apparatus for performing operations such as positively locating portions of an automotive vehicle body being welded together in an assembly line process, the apparatus comprising:

a support frame including a frame roof supported above a generally horizontal support surface;

at least four gate assemblies supported in a circumferentially-spaced array on the frame roof for rotational movement around a common vertical axis and forming two gate assembly pairs of diametrically-opposed gate assemblies, the gate assemblies of each gate assembly pair being supported for pivotal movement between respective diametrically-opposed stowed and working positions about respective horizontal axes;

a rotary drive operatively connected to the gate assemblies and configured to rotate the gate assemblies around the common vertical axis between respective diametrically-opposed framing positions transverse to the vehicle path and one or more idle positions disposed between the framing positions, the rotary drive being configured to selectively position the gates of each gate assembly pair in the framing positions;

a pivot drive operatively connected to the gate assemblies and configured to pivot the gate assemblies of the selected gate assembly pair between their respective diametrically-opposed stowed and working positions on either side of a vehicle body to be welded;

tool fixtures supported on the gate assemblies and configured to support tools in positions to perform operations on a vehicle body positioned under the frame roof when the gate assemblies supporting the tool fixtures are in their respective working positions, each gate assembly pair supporting tool fixtures positioned to allow tools to perform operations on a specific corresponding vehicle body type; and a rotary carrousel supported on the frame roof for rotation around the common vertical axis, the gate assemblies being pivotally supported on the rotary carrousel and disposed above the frame roof when in their respective stowed positions to allow the lateral dimensions of the support frame to be smaller than a diametrical reach of the gate assembly pairs in their stowed positions and to allow the height of the support frame to be less than would be required to suspend the carrousel and gate assemblies below the frame roof.

2. An automotive framing apparatus as defined in claim 1 in which six gate assemblies are supported in a circumferentially-spaced array on the gate assembly carrousel for rotational movement around the common vertical axis and form three gate assembly pairs of diametrically-opposed gate assemblies, the gate assemblies of each gate assembly pair being supported for pivotal movement between respective diametrically-opposed stowed and working positions about respective horizontal axes.

3. An automotive framing apparatus as defined in claim 1 in which the gate assembly carrousel includes a circular rail coaxially supported on the frame roof relative to the common vertical axis and configured to support the gate assemblies in the stowed position, the rail including diametrically opposed gaps configured and positioned to allow the gate assemblies of a gate assembly pair in the framing position to be pivoted downward.

4. An automotive framing apparatus as defined in claim 3 in which:
   the carrousel includes four circumferentially-spaced gate assembly pivot mounts pivotally connected to respective inner ends of each gate assembly; and
   a roller is supported on each gate assembly in a position spaced from the gate assembly pivot mount and is aligned with the circular rail.

5. An automotive framing apparatus as defined in claim 1 in which the pivot drive includes a ram supported on the frame roof for linear reciprocal movement along the common vertical axis and drivingly connected to the gate assemblies, the ram being configured to raise the gate assemblies to their respective stowed positions and to lower the gate assemblies of a gate assembly pair in the framing position to their respective working positions.

6. An automotive framing apparatus as defined in claim 5 in which the pivot drive includes four pivot linkages, one end of each pivot linkage being pivotally connected to one of the gate assemblies in a position spaced from the gate assembly pivot mount connected to that gate assembly and another end of each pivot linkage operatively engaging the ram.

7. An automotive framing apparatus as defined in claim 6 in which the ram includes a rotating portion configured to rotate with the pivot linkages.

8. An automotive framing apparatus as defined in claim 7 in which the pivot drive includes a ball screw drive drivingly connected to a ball screw that is drivingly connected to the ram and is configured to reciprocally move the ram along the common vertical axis.

9. An automotive framing apparatus as defined in claim 8 in which the ram includes:
   a stationary sleeve supported on the frame roof; and
   a ram head supported on a sliding sleeve that is telescopically supported within the stationary sleeve, the head and sliding sleeve being slidably supported within the stationary sleeve for reciprocal motion along the common vertical axis, the ball screw drivingly engaging the sliding sleeve.

10. An automotive framing apparatus as defined in claim 1 in which the carrousel includes a circular toothed rack and the rotary drive includes a rotary drive motor drivingly connected to a gear.

11. An automotive framing apparatus as defined in claim 10 in which each gate assembly includes a support arm pivotally connected to the carrousel and a gate portion removably mounted to the support arm.

12. An automotive framing apparatus as defined in claim 1 in which the tool fixtures include holding devices configured to positively locate portions of a vehicle body in proper relative positions to be welded together when the gate assemblies are in their respective working positions.

13. An automotive framing apparatus as defined in claim 1 in which the support frame includes gate locator pins positioned and configured to drive into complementary recesses formed in the gate assemblies when the gate assemblies are in their working positions.

14. A method for performing operations on automotive vehicle bodies having differing configurations and being assembled in an assembly line process; the method including the steps of:

providing a framing apparatus including at least four gate assemblies supported on a frame roof for rotational movement around a common vertical axis and forming two gate assembly pairs of diametrically-opposed gate assemblies, the gate assemblies of each gate assembly pair being supported for pivotal movement between respective diametrically-opposed stowed and working positions about respective horizontal axes, a rotary drive configured to selectively position one gate assembly pair at a time in a framing position from which the two gate assemblies of the selected gate assembly pair can be pivoted downward to respective diametrically opposed working positions, a pivot drive configured to pivot the gate assemblies of the selected gate assembly pair between their respective stowed and working positions, each gate assembly pair supporting tool fixtures positioned to allow tools to perform operations on a specific corresponding vehicle body type; and a rotary carrousel rotationally supported on the frame roof and supporting the gate assemblies above the frame roof when in their respective stowed positions;

pivoting the gate assemblies of a previously selected gate assembly pair to their respective stowed positions;

rotating the carrousel to position a newly selected gate assembly pair in the framing position;

downwardly pivoting the gate assemblies of the newly selected gate assembly pair to their respective working positions on either side of a first vehicle body being assembled; and activating the tools supported on the newly selected gate assembly pair to perform operations on the first vehicle body.

15. The method of claim 14 including the additional step of activating the tools supported on the newly selected gate assembly pair to perform operations on a second vehicle body of the same general configuration as the first vehicle body and disposed on the vehicle path between the gate assemblies.

16. The method of claim 15 in which the step of activating the tools to perform operations on a second vehicle body includes:
   upwardly pivoting the gate assemblies of the newly selected gate assembly pair to an intermediate position clear of the vehicle path;
   moving the first vehicle body from between the newly selected gate assembly pair;
   moving the second vehicle body to a position between the newly selected gate assembly pair; and
   downwardly pivoting the gate assemblies of the newly selected gate assembly pair to their respective working positions; and
   activating the tools supported on the newly selected gate assembly pair to perform operations on the second vehicle body.

17. The method of claim 14 in which the step of downwardly pivoting the gate assemblies of the newly selected gate assembly pair to their respective working positions is followed by the step of driving at least one locator pin into engagement with at least one of the gate assemblies in the working position.

* * * * *